Figure 3:
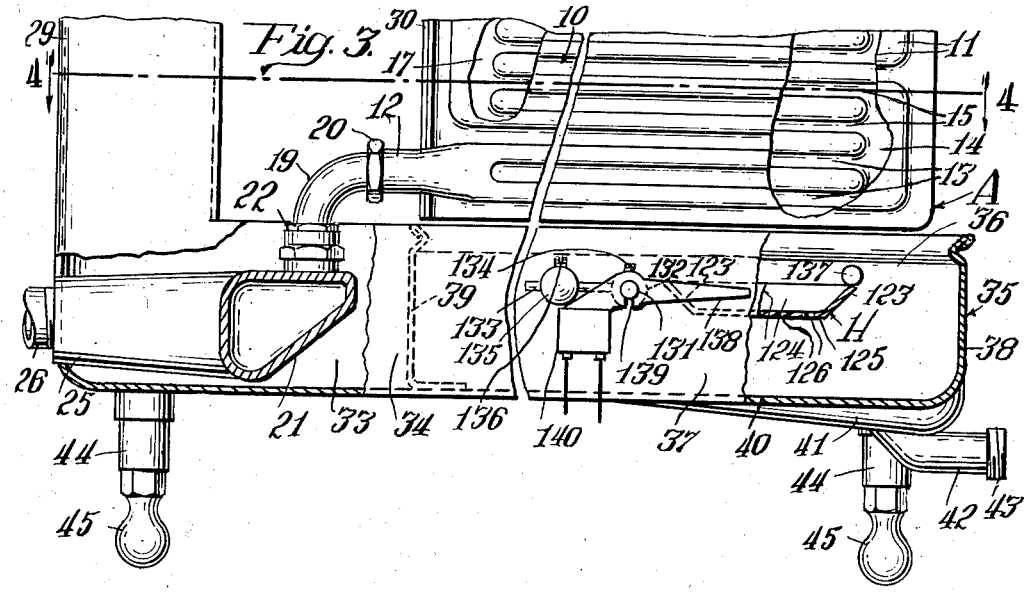

Feb. 21, 1939. H. G. MOJONNIER 2,147,912
HEAT EXCHANGE SYSTEM
Filed May 2, 1938 2 Sheets-Sheet 1
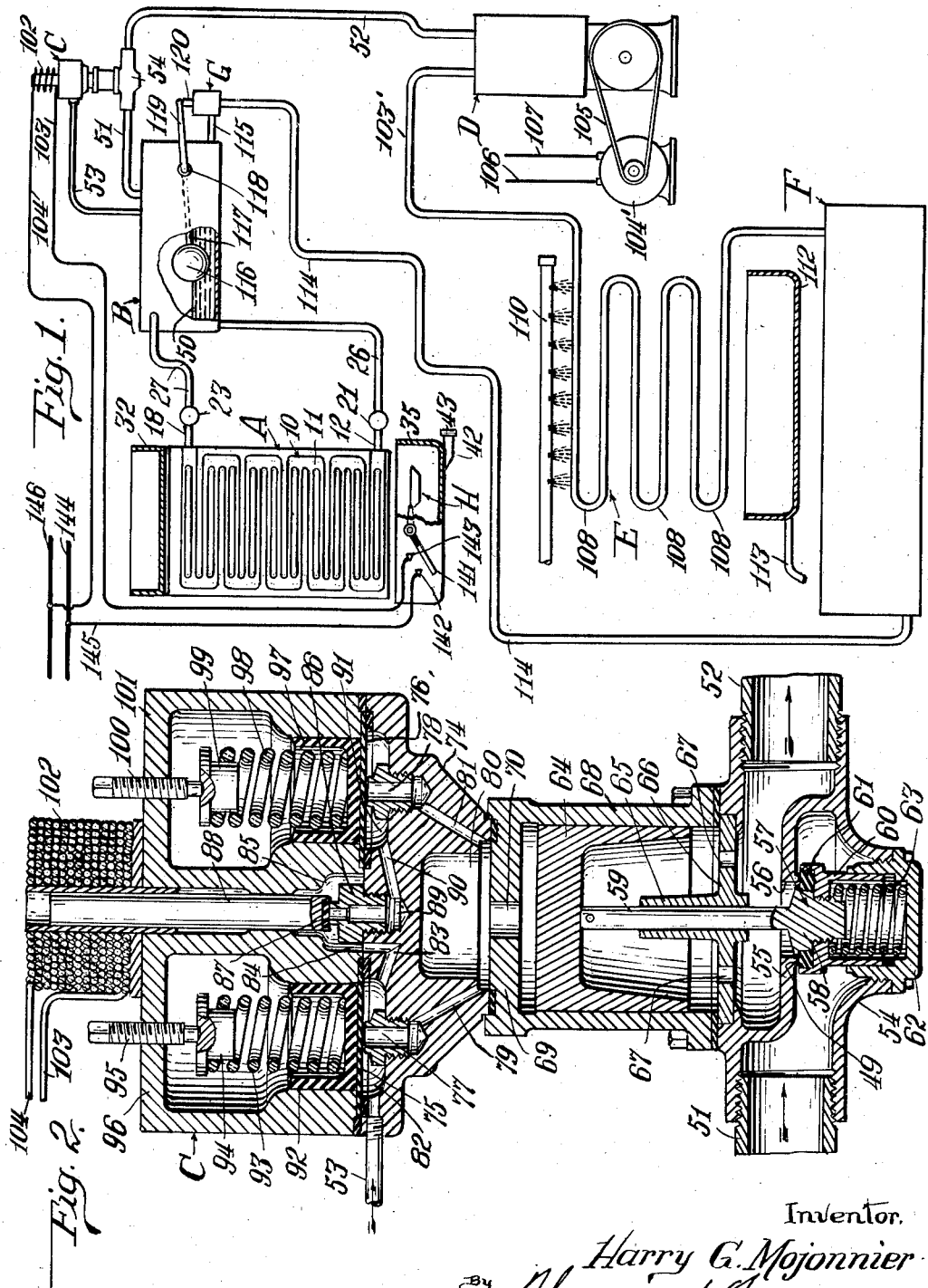
Inventor.
Harry G. Mojonnier
By Thomas H. Ferguson
Attorney.

Inventor
Harry G. Mojonnier
By Thomas H. Ferguson
Attorney

Patented Feb. 21, 1939

2,147,912

UNITED STATES PATENT OFFICE

2,147,912

HEAT EXCHANGE SYSTEM

Harry G. Mojonnier, Oak Park, Ill., assignor to Mojonnier Bros. Co., a corporation of Illinois Application May 2, 1938, Serial No. 205,425

5 Claims. (Cl. 62—141)

The present invention relates to heat exchange systems and has to do more particularly with the control of the temperature in the heat exchange elements.

The principal object of the invention is to provide a system of the kind mentioned wherein the temperature of the heat exchange medium within the heat exchange elements will be changed in accordance with certain changes in the rate of flow of the liquid being treated.

The invention has been developed in connection with the heat treatment of milk and milk products and accordingly will be so described, although it will be apparent that the same may be used in the treatment of other liquids.

As illustrative, we may consider the application of the invention to the efficient cooling of milk with ammonia as the refrigerant. While the milk is flowing over the cooling elements of the exchanger, it is desirable to maintain the ammonia which is in liquid form as it enters the heat exchange elements, at a temperature of about 28 degrees Fahrenheit. This is below the freezing point. Hence, if no provision be made to meet the objection, as soon as the flow of milk falls off or stops, the milk will freeze on the cooling elements. Then when the milk flow starts up again, the ice formed on the elements will act as an insulator and therefore satisfactory cooling is impossible. But by the use of the present invention this freezing will be avoided. A selective regulator is used to change the ammonia temperature from a freezing one to a non-freezing one. Ordinarily this is a change from 28 degrees Fahrenheit to 34 degrees Fahrenheit. This change is made in accordance with the milk flow. A heavy flow brings on the low temperature and a falling off or stopping of the flow brings on the high temperature.

More specifically stated, I employ a back pressure regulator having two diaphragms and these are brought into play, the one or the other, as the milk flow changes from heavy to light, or vice versa. The diaphragms are subjected to pressure in the suction side of the system, and thus by maintaining one pressure or the other, the corresponding and desired temperatures result. A perforated tray or pan is located in the path of travel of the treated milk, and is used to bring about proper operation of the regulator. When a full flow of milk is on, the pan is pressed down by the milk stream and occupies one operative position. When the flow is light or partial, the milk will pass through the perforations of the pan fast enough so that it will not accumulate in the pan, and therefore the pan will not be moved downward. Hence, in this condition of flow, the pan remains elevated and this is the second operative position of the pan. One operative position corresponds to the high pressure of ammonia gas, while the other corresponds to the low pressure of ammonia gas, the former producing the higher temperature and the latter the lower temperature.

For a full understanding of the invention reference should be had to the following detailed description taken in connection with the accompanying drawings, while the scope of the invention will be particularly pointed out in the appended claims.

Figure 4:
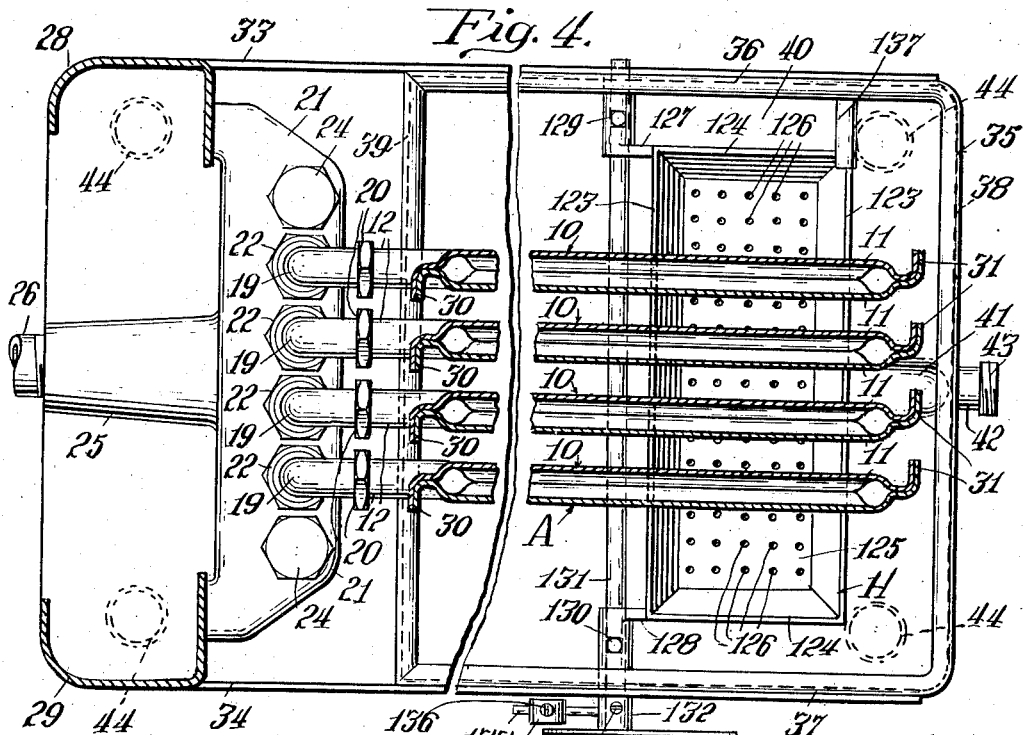

In said drawings, Fig. 1 is a diagram of a heat exchange system designed for cooling milk by the use of ammonia, in what is called a gravity controlled system, the parts being constructed and arranged in accordance with the present invention. Fig. 2 is a central vertical section of a regulator used in the control of the ammonia gas pressure, and, hence, in the control of the heat exchanger temperature. Fig. 3 is a side elevation of a portion of a heat exchanger, illustrating particularly the pan in the path of travel of the milk as it leaves the exchange elements, the same operating to control the regulator. And Fig. 4 is a horizontal section through the structure of Fig. 3, illustrating particularly the extent of the pan and its location relative to the exchange elements, the plane of section being indicated by the line 4—4 of Fig. 3. Throughout these views like characters refer to like parts.

Upon a consideration of the diagram of Fig. 1, A designates the heat exchanger; B, the surge tank which receives the ammonia; C, the regulator by which the pressure in the tank is controlled; D, the compressor; E, the condenser; F, the receiver; G, the float controlled valve for admitting liquid ammonia to the surge tank; and H, the pan or tray in the bottom of the heat exchanger which operates in accordance with the milk flow to actuate the regulator C.

The heat exchange elements 10 of the heat exchanger A are of well known construction, being in general like those illustrated and described in the United States Patent No. 2,040,947, granted May 19, 1936, to O. W. Mojonnier et al. Each element is made up of constituent plates 11 which are pressed into shape to provide interior passages for the flow of the controlling medium, whether the same be ammonia, brine, chilled water, or otherwise, for cooling; or steam, hot water, or otherwise, for heating. By referring to the heat exchange element 10, shown in Fig. 3, it will be seen that from an intake pipe 12, two parallel passages 13 extend to the right, where they communicate with an end passage 14, and the latter through two parallel passages 15 communicates with an end passage 17 at the left. The remainder of the path of travel through the heat exchange element under consideration, extends back and forth and finally passes from the element through the outlet pipe 18. In the aforesaid Patent No. 2,040,947, the elements are provided with hinges and tubular hose connections. In this instance, each of the intake and outlet pipes 12 and 18 is provided with a hollow hinge 19. A flanged union nut 20 unites the hinge 19 to the element terminal in each case. In a similar way the lower end of the hinge is connected to the associated manifold 21 by a suitable stuffing box connection 22. In this way each of the elements 10 is free to rotate upon its mated hinges 19, the one connected with the lower manifold 21 and the other with the upper manifold 23. As shown in Fig. 4, there are four heat exchange elements 10 and the manifolds are arranged for two extra elements in case they are required. As shown in the case of manifold 21, the openings for the hinges required by these extra elements are closed by suitable plugs 24. The manifold 21 has a laterally extending central tubular portion 25, and into the outer threaded end of this portion is threaded the intake pipe 26. In a similar way, the manifold 23 is provided with a central portion connected to outlet pipe 27.

The manifolds 21 and 23 are connected to uprights 28 and 29 of the exchanger frame. The arrangement of these manifolds relative to the frame members can be completely understood from a consideration of the manifold 21 which is fully illustrated. Obviously, the heat exchange medium coming in through pipe 26 will pass through the several hinges 19 and the associated exchange elements 11 and out through the corresponding outlets 18 and associated hinges in parallel into manifold 23 and from that point through pipe 27 on to the surge tank B. The elements 10 have their inner and outer ends turned laterally to form strengthening flanges 30 and 31. When in service the heat exchange elements 10 are spaced apart by a distributor 32 indicated in the diagram of Fig. 1. This distributor rests upon the upper edges of the elements 10, all as shown more particularly in the aforesaid Patent No. 2,040,947. When it is desired to clean the elements 10, the distributor 32 is removed and the elements swung apart on their hinges 19. After cleaning, they are returned to normal operating position and the distributor 32 is put back in place.

The frame members 28 and 29 are suitably secured together at their upper ends while at their lower ends they are secured respectively to side frame members 33 and 34 which lie horizontally and are welded to the side members 36 and 37 of a receiving pan 35 which is positioned directly below the elements 10 and extends far enough to catch all the liquid which falls from them. The receiving pan 35 has a front wall 38, a rear wall 39 and a bottom 40, besides the side walls 36 and 37. The bottom 40 is depressed slightly at 41 to form a trough for the collection of residual liquid and the guiding of the same to the outlet pipe 42, which is suitably threaded at 43 for a pipe connection. Thus, in operation the collected liquid is continuously carried off through a suitable discharge pipe. Ordinarily, in service the exchange elements 10 are inclosed within cabinet doors but these need not be disclosed herein. Reference may be had to the aforesaid Patent No. 2,040,947 for an illustration and description of these. The bottom of the exchanger A is provided with four legs 44 having ball feet 45.

The refrigerating system illustrated is that employing ammonia as a refrigerant, and the control is what is called a gravity control. In operation there is ammonia in the tank B and it passes from that tank through the inlet pipe 26 into the elements 10, as before pointed out. From these elements it passes back again to tank B through pipe 27. While passing upward through the elements 10, the ammonia changes from a liquid form to a gaseous form. Hence when it reaches tank B, it remains in gaseous form above the liquid ammonia therein, the level of the latter being indicated at 50. The change in the condition of the ammonia as it travels up through the elements 10 is the result of its taking up heat from the liquid being treated, namely, the milk which flows down over the elements.

The main valve of the controller C is positioned in the suction line made up of pipes 51 and 52, pipe 51 extending from the upper portion of tank B through to the intake side of the controller, and pipe 52 passing from the outlet side of the same on to the compressor D. A feeler pipe 53 extends from the upper portion of the surge tank B to the upper portion of controller C. The controller is one of well known construction, and is what is known to the trade as a dual-pressure, back-pressure valve or regulator. The main portion of the regulator includes a body 54 divided by a partition 55 which is provided with a central aperture 56. Surrounding this aperture on the under side of the partition is an annular rib or bead 49, which constitutes the seat of the valve. The cooperating movable member is the valve member 57. This member includes a head 58 formed at the lower end of stem 59, a shell 60 having its upper end threaded upon the head 58, and a cushion 61 seated between the upper end of the shell 60 and the head 58. The shell is cylindrical and is movably guided within the cylindrical walls of a guiding cap 62 threaded into a suitable opening in the valve body 54. A coiled compression spring 63 serves, when unhindered, to seat the valve 57 upon its seat 49. This spring acts between a shoulder near the upper end of the shell 60 on the one hand and the cap 62 on the other hand. It will be seen that as the valve 57 is moved downward the end of the shell 60 will engage a stop shoulder, thus limiting the downward movement of the valve, while the upward movement of the valve, brought about by the expansion of spring 63, will be limited by the closing of the valve 57, the member 61 engaging the seat 49.

The upper end of the valve stem 59 is secured to a piston 64. This stem extends through a guiding sleeve 65 formed at the center of a web 66 which is secured in place as illustrated. This web has a plurality of openings 67 which extend completely through it, and thus place the space on the under side of the piston 64 in permanent communication at all times with the interior of the outlet pipe 52. The piston 64 is mounted to reciprocate in the bore of a cylinder 68 which is secured to the upper side of the body 54 of the valve. The upper end of the cylinder 68 is closed by an end 69 except for a central aperture 70. The structure is such that pressure on the upper side of the piston 64 will push it downward against the compression of the spring 61, and, upon removal of the pressure above the piston, the spring will restore the valve to its closed position.

In order to get the necessary pressure on the upper side of the piston 64, suitable passages are provided from the feeler pipe 53. These are all located, together with the controlling valves, within an upper casing 74 which is secured at its lower end to the upper portion of the cylinder 68 in any suitable way. Within the casing 74 there are a number of passages which are arranged to bring the spring pressed diaphragm 75 at the left, as the parts are viewed in Fig. 2, or the spring-pressed diaphragm 76, at the right in the same figure, into service. The diaphragm 75 normally closes the upper end of a tubular valve seat 77. In like manner diaphragm 76 normally closes the upper end of a similar tubular valve seat 78. As clearly shown, the open lower end of tube 77 communicates through passage 79 with the chamber 80, which is in direct communication through passage 70 with the space on the upper side of the piston 64. Similarly, the lower end of the tubular valve seat 78 is in direct communication through a passage 81 with the same space 80. In addition to these passages, the space 82 on the under side of the diaphragm 75 is in direct communication with the interior of the feeler pipe 53. This space 82, as clearly shown, extends all the way around the tubular valve seat 77. The space 82 is in direct communication through passages 83 and 84, with a space 85 directly above and adjacent to the upper end of a tubular valve seat 86, located in the casing 74 about midway between the diaphragms 75 and 76. The valve seat 86 is normally closed by a bearing member or cushion 87 at the lower end of the solenoid core 88. When this core is raised so as to open the valve then space 85 is in direct communication with chamber 89. The latter chamber is also in communication through passage 90, with space 91 on the under side of diaphragm 76.

On the upper side of diaphragm 75 is a cup-shaped piston 92 which is normally pressed down against the diaphragm 75 by a compression spring 93. This spring rests at its lower end within the cup of the piston 92, and at its upper end, it engages the flange of a head 94, which may be forced downward by an adjusting screw 95, threaded into a suitable opening in the end 96 of that portion of the casing 74 which incloses the piston 92 and its spring 93. A similar construction is provided in association with the diaphragm 76. There the cup-shaped piston 97 cooperates with a spring 98 and the latter, through head 99 and screw 100, may be used to bring about proper pressure upon the diaphragm, the screw 100 being threaded into the end 101 of that portion of the casing 74 that includes the piston 97 and its spring 98.

Above the heads 96 and 101 of the casing is a solenoid winding or coil 102. Electric conductors 103 and 104 lead from its terminals to a suitable source of current. When the coil 102 is energized, the core 88 is raised to open the valve 87. When the coil 102 is deenergized, then the core 88 falls under the action of gravity and thereby closes valve 87. As we shall see more fully hereinafter, the coil 102 is electrically under the control of the pan H.

Now, with reference to the operation of the controller C, it will be noted that, when the solenoid core 88 is down and valve 87 is closed, then the diaphragm 75 at the left, as the parts are viewed in Fig. 2, will be available for service, but the diaphragm 76 will not be available for service. It is diaphragm 75 that will operate under the high pressure and diaphragm 76 that will operate under the low pressure. When diaphragm 76 is to be used then the solenoid valve 87 must be open. When it is closed then only diaphragm 75 is available. The spring 93 is preferably heavier than the spring 98 in order to suit the diaphragm 75 to the heavier pressure, and the diaphragm 76 to the lighter pressure.

Now, if it be assumed that the ammonia gas within the surge tank B and feeler pipe 53 can only pass as far as diaphragm 75 and cannot reach diaphragm 76, then the pressure maintained in the tank B will be the high pressure. Thus, for example, the spring 93 may be set to hold the gas pressure at, say, 50 pounds per square inch. When so set, then, obviously, any increase of gas pressure beyond the 50 pounds, will cause diaphragm 75 to rise and gas under the increased pressure will pass through tube 77, passage 79, chamber 80, and passage 70 to the upper side of the piston 64. Under these circumstances, the spring 63, which opposes the pressure of piston 60, is such as to present a less opposing force than that applied by the piston. As a result, the valve 57 will be opened and the gas in the upper part of tank B will pass at once through pipes 51 and 52, which pipes constitute the suction line to the intake of the compressor D. This will cause the pressure in the tank B and the feeler pipe 53 to fall away. When it has been lowered sufficiently, then diaphragm 75 will come into contact with seat 77 and shut off the further supply of high pressure gas to the piston 64. The spring 61 will thereupon return the valve 57 to its seat. This action will take place automatically over and over again whenever the pressures change sufficiently. Thus, with the diaphragm 75 in service, the pressure of the gasified ammonia in the tank B and the upper portions of the elements 10, under the assumed setting of the spring 93, will be kept at approximately 50 pounds per square inch. In practice it has been found that this pressure gives a temperature of about 36 degrees Fahrenheit in the coldest portions of the cooling elements.

Again, if it be assumed that the solenoid core 88 is raised, then, as before noted, the interior of the feeler pipe will be in direct communication with space 91 on the under side of the diaphragm 76. This path may be traced from feeler pipe 53 through space 82, passages 83 and 84, chamber 85, the interior of valve tube 86, chamber 89, and passage 90, to the space 91 below the diaphragm 76. With this communication open between the feeler pipe 53 and the under side of diaphragm 76, and a lower pressure available for the control of the main valve 57, it is clear that the lower pressure will not raise the diaphragm 75 against the pressure of the stronger spring 93 and so there will be no communicating passage through valve tube 77 and passage 79, as before. Now, in operation, the lower pressure being available in the gas supplied to the under side of the diaphragm 76, it will be clear that there will be a rising and falling of this diaphragm in the manner previously described in connection with the diaphragm 75, whenever the pressure in the surge tank B varies slightly from that for which the spring 98 of the piston 97 is set. In such operation the diaphragm 76 will open the passage from chamber 91 through the tubular seat 78 and passage 81 to the chamber 80, and thus to the upper side of the piston 64, causing its operation in the manner previously described in connection with the diaphragm 75. It will be borne in mind that the spring 61 is relatively weak and will not interfere with the operation of the valve 57 under the less pressure available in the operation of the diaphragm 76. As illustrative, the pressure for which the spring 98 may be set may be assumed to be 43 pounds per square inch. When so set, diaphragm 76 keeps the gas pressure in the tank B and the feeler pipe 53 at substantially this value. And in practice it has been found that in a given installation, this pressure of 43 pounds, will give a temperature of about 28 degrees Fahrenheit, to the coldest portions of the cooling elements 10.

Thus, with the diaphragm 76 in service, the lower freezing temperature will be used with the heavy flows of milk over the elements. And this condition must prevail as long as the solenoid coil 102 is energized. But should the solenoid be deenergized, then diaphragm 75 will come into play, and then only the higher pressure of say, 50 pounds, will result, with the corresponding temperature of about 36 degrees, a condition desired when the light flows of milk over the elements 10 occur.

Thus, it will be seen from what has been said that the regulator C provides a dual control, each according to a given pressure. It will also be obvious that the different pressures correspond to different temperatures in the exchange elements 10, as before stated. Thus, if the diaphragm 76 be in use, then the exchanger A may be run at full capacity with a heavy flow of liquid over the elements. On the other hand, when the flow drops off, then the diaphragm 75 is brought into play and the higher pressure at which the gasified ammonia is kept maintains a higher temperature in the elements 10.

When it comes to the compressor D, the same is of usual construction and draws in the gasified ammonia through suction line 51, 52 and compresses the same, and passes it in compressed condition out through pipe 103' to the intake of the condenser E. As shown, the compressor D is driven by an electric motor 104' operating through a belt 105 and receiving electric current through conductors 106 and 107. The circuit of the motor may be controlled in any desired way.

The condenser E is shown as comprising a series of coils 108 through which the compressed gasified ammonia is passed into a receiver F. As the compressed gas passes through these coils, cooling water from a supply pipe 110 passes down over the coils and as a result the compressed gas is liquefied and passes into the receiver F in liquid form. A basin 112 is indicated beneath the coils 108 and serves to collect the water which passes down over them. From this basin a pipe 113 leads to some suitable discharge point.

The liquid ammonia passes from the receiver F up through the pipe 114 to the float control valve G, associated with the surge tank B. The pipe 114, as shown, enters the lower portion of the valve G and the latter is connected by a short pipe 115 with a lower portion of the tank B. As before stated, the liquid ammonia in the tank B is at a definite height indicated by the line 50. As the level of this liquid may fall, valve G is opened to allow the passage of more liquid into the tank B. The float control includes a float 116 on the free end of an arm 117 which is pivoted at 118, and, by means of an operating arm 119, presses down on a plunger 120 to close the valve whenever the float 116 rises. When the float 116 falls, then the plunger 120 moves in the opposite direction to open the valve and allow liquid to enter the chamber B. There are many valves which are controlled by floats, and it seems unnecessary therefore to illustrate such a valve in detail. Suffice it to call attention to the following United States patents which show valves of this kind: No. 604,018, Carmichael, May 17, 1898, No. 1,886,468, Cornish, November 8, 1932, and Re. No. 18,253, Heath, November 17, 1931.

When it comes to the control of the solenoid coil 102 by opening and closing the electric circuit through conductors 103 and 104, it will be noted that this is done by the pan H, which is pivoted within the receiver 35 in a position to catch some of the liquid which is delivered from the bottoms of the exchange elements 10. This pan or tray H is rectangular in shape having side walls 123 and ends 124 and a bottom 125, the latter being provided with a number of perforations 126. The pan H is carried by two arms 127, 128 which have hubs which are secured by set screws 129, 130 to a transverse shaft 131 which is journaled at its opposite ends in the side members 36, 37 of the receiver 35, at points well above the bottom of the receiver. To counter-balance the pan H, there is provided on the outer end of the shaft 131 a sleeve 132 which carries an arm 133. The sleeve 132 is secured to the shaft 131 by set screw 134. The arm 133 carries a counter-weight 135 which is held in place upon the arm by a set screw 136. By positioning the counter-weight 135 at a suitable point on the arm 133, the pan H may be yieldingly held against downward movement as the liquid flows into it.

It will be seen that as the liquid flows over the elements 10, some of it will pass from each element into the tray H and if the flow is not too heavy all of the liquid will pass out through the perforations 126. But, if the flow increases, then the liquid may not pass through the perforations 126 as rapidly as it flows into the pan. If it does not, then the liquid will, as it were, back up and more or less fill the pan. The point at which this tilting of the pan will occur will depend, of course, upon the setting of the counter-weight 135. Thus, it is clear that the pan may occupy an elevated position in which it engages a stop 137. This would be the position when there was nothing in the pan, or when the liquid flowing into the pan, passed out through the perforations 126 as fast as it came in. In such case there would be no backing up of the liquid to overcome the counter-balancing effect of the weight 135. The other position, however, would be that occupied by the pan when the flow of liquid was sufficiently heavy to rock the pan about its pivotal axis through shaft 131.

The position of the pan H within the receiver 35 is indicated on the outside of the receiver by a pointer 138 which is fitted upon the outer end of the shaft 131. Preferably, this pointer is provided with a slot 139 which slips over a suitable neck near the end of the shaft, which neck has parallel sides against which the edges of the pointer on opposite sides of the slot 139 fit so as to hold the pointer against rotation except it be in response to rockings of the supporting shaft 131. The pointer 138 consists of a plate of some length and at one end the same carries a switch box 140. The switch in the box is a mercury switch, and in one position of the pan H, the switch is tilted so as to open a simple circuit and in the other position of the pan it closes the same circuit. These mercury switches are well known and because of the simplicity of the one employed, it seems needless to illustrate the same.

The switch I employ is diagrammatically represented in Fig. 1, wherein the bridging contact 141 cooperates with fixed contacts 142 and 143. As shown in this view, the normal position of the pan H leaves the circuit through the solenoid coil 102 open. In other words, while the pan H is empty or receiving a light flow of liquid, only the diaphragm 75, corresponding to the higher pressure and higher temperature, is in use. However, when the pan H is moved downward, the circuit through the solenoid coil 102 will be closed. This circuit may be traced from supply lead 144, through conductor 145, fixed contact 142, bridging contact 141, fixed contact 143, conductor 103, coil 102, and conductor 104 to supply lead 146. Thus, the downward movement of the pan H closes the circuit and brings the diaphragm 76, corresponding to the lower pressure and lower temperature, into service to the exclusion of the diaphragm 75. Expressed in another way, with the pan H in its upper position, the solenoid circuit is open, the diaphragm 75 is in service, and the pressure and temperature are of high values, while with the pan H in its lowermost position, the solenoid circuit is closed, the diaphragm 76 is in service, and the pressure and temperature are of low values. With the numerical values previously mentioned as illustrative, while the diaphragm 76 is in service, the pressure of the gasified ammonia would be 43 pounds, and the corresponding temperature 28 degrees, brought into service with a heavy flow of liquid, and, alternatively, while the diaphragm 75 is in service, the pressure would be 50 pounds, and the corresponding temperature 36 degrees, brought into service by a light flow or non-flow of liquid.

In carrying out the invention, it will be apparent that different kinds of heat exchange elements might be employed, other liquids than milk might be treated, and there might be other exchanges of heat. In some instances, it might be desirable to change from one degree of temperature to another when heating a liquid rather than when cooling it. Likewise, many changes in the details of the mechanism employed will suggest themselves to persons skilled in this art. It is therefore aimed to cover by the terms of the appended claims all of those alterations, modifications and uses which rightly come within the spirit and scope of the invention.

I claim:

1. A heat exchange system for use with a heat exchange medium readily vaporizable at ordinary temperatures, including a heat exchange element operable to bring a liquid to be treated and said medium into heat exchanging relation with each other, means for supplying said medium in liquid form to said element, means for receiving said medium from said element after it has been heated by the liquid being treated and is thereby gasified, means for delivering the liquid to be treated to said element, means for receiving the treated liquid from said element, a regulator selectively operative according to its setting to maintain the gasified medium within said medium receiving means at a plurality of definite pressures, and means responsive to the amount of treated liquid passing per unit of time from the delivery point of said element to set said regulator.

2. A heat exchange system for use with a heat exchange medium readily vaporizable at ordinary temperatures, including a heat exchange element operable to bring a liquid to be treated and said medium into heat exchanging relation with each other, means for supplying said medium in liquid form to said element, means for receiving said medium from said element after it has been heated by the liquid being treated and is thereby gasified, means for delivering the liquid to be treated to said element, means for receiving the treated liquid from said element, a compressor, a suction line extending from said medium receiving means to said compressor, a valve in said suction line, two selectively operative devices for controlling said valve, and means responsive to the amount of liquid passing per unit of time from the delivery point of said element, to operate said devices.

3. A heat exchange system for use with a heat exchange medium readily vaporizable at ordinary temperatures, including a heat exchange element operable to bring a liquid to be treated and said medium into heat exchanging relation with each other, means for supplying said medium in liquid form to said element, means for receiving said medium from said element after it has been heated by the liquid being treated and is thereby gasified, means for delivering the liquid to be treated to said element, means for receiving the treated liquid from said element, a compressor, a suction line extending from said medium receiving means to said compressor, a valve in said suction line, two selectively operative devices for controlling said valve, electromagnetically actuated means for operating said devices, an operative circuit for said electromagnetically actuated means, a switch for said circuit, and a device actuated by the flow of treated liquid to operate said switch.

4. A heat exchange system for use with a heat exchange medium readily vaporizable at ordinary temperatures, including a heat exchange element operable to bring a liquid to be treated and said medium into heat exchanging relation with each other, means for supplying said medium in liquid form to said element, means for receiving said medium from said element after it has been heated by the liquid being treated and is thereby gasified, means for delivering the liquid to be treated to said element, means for receiving the treated liquid from said element, a compressor, a suction line extending from said medium receiving means to said compressor, a valve in said suction line, two selectively operative devices for controlling said valve, electromagnetically actuated means for operating said devices, an operative circuit for said electromagnetically actuated means, a switch for said circuit, lever means pivoted beneath said element and operative to open and close said switch, and a perforated pan carried by said lever means and lying beneath said element to catch some of the treated liquid delivered therefrom, said pan descending under a heavy flow of liquid from said element to place said switch in one operative circuit condition and rising under a light flow of liquid from said element to place said switch in another operative circuit condition.

5. A heat exchange system including a plurality of heat exchange elements of the surface type adapted to occupy upright positions in substantially parallel relation to each other, means for distributing a liquid to be treated so as to flow over said elements and fall therefrom at their delivery ends, a pivotally mounted perforated tray extending beneath said elements in position to catch liquid flowing therefrom and operated by the weight of the liquid to move downward when the flow is heavy and to move upward when the flow is light, means for supplying a heat exchange medium to the interiors of said elements, and means controlled by said tray movements to vary the character of said heat exchange medium.

HARRY G. MOJONNIER.